United States Patent [19]

Locastro et al.

[11] 4,362,470

[45] Dec. 7, 1982

[54] WIND TURBINE

[76] Inventors: Gerlando J. Locastro, 28 Rosemary La., Centereach, N.Y. 11720; Peter P. Giemsch, 1020 Hawkins Ave., Lake Grove, N.Y. 11755

[21] Appl. No.: 256,905

[22] Filed: Apr. 23, 1981

[51] Int. Cl.$^3$ .................................................. F03D 3/06
[52] U.S. Cl. .......................... 416/197 A; 416/DIG. 2
[58] Field of Search ...................... 416/197 A, DIG. 9

[56] References Cited

U.S. PATENT DOCUMENTS

| | | | |
|---|---|---|---|
| 2,252,788 | 8/1941 | Sparr | 416/197 A |
| 4,005,947 | 2/1977 | Norton et al. | 416/197 A |
| 4,177,009 | 12/1979 | Baum et al. | 416/197 A X |

FOREIGN PATENT DOCUMENTS

| | | | |
|---|---|---|---|
| 601266 | 2/1926 | France | 416/4 |
| 727519 | 6/1932 | France | 416/197 A |
| 797106 | 4/1936 | France | 416/197 A |
| 59016 | 4/1954 | France | 416/DIG. 6 |
| 596447 | 3/1978 | Switzerland | 416/197 A |
| 1518151 | 7/1978 | United Kingdom | 416/197 A |

*Primary Examiner*—Everette A. Powell, Jr.
*Attorney, Agent, or Firm*—Michael J. Striker

[57] ABSTRACT

A wind turbine has a shaft rotatable about an axis, and a plurality of blades mounted on the shaft and arranged to be rotated by wind and thereby rotate the shaft, wherein each of the blades has an outer portion which has an outer edge formed at the outer end of a radius with a center at the axis of the shaft and extends rearwardly from the outer edge over a circumference described from the center, and each of the blades has an inner edge which is rearwardly offset relative to the outer edge in a direction which is normal to the radius.

9 Claims, 3 Drawing Figures

WIND TURBINE

BACKGROUND OF THE INVENTION

The present invention relates to a wind turbine, a windmill, and the like.

Wind turbines are known in the art and widely utilized. Wind turbines of one type have a plurality of blades each in the form of an S-shape and the like. One of such wind turbines is disclosed, for example, in the U.S. Pat. No. 4,005,947. Requirements which are made to the wind turbines are that they must rotate even under the action of a very weak wind, generate a sufficient torque, produce a low noise, etc. The known wind turbines, including the wind turbine disclosed in the above mentioned patent, possess some disadvantages in the sense of satisfying the above mentioned requirements.

SUMMARY OF THE INVENTION

Accordingly, it is an object of the present invention to provide a wind turbine which avoids the disadvantages of the prior art.

More particularly, it is an object of the present invention to provide a wind turbine which rotates under the action of a very weak wind, generates a considerable torque, and produces a low noise.

In keeping with these objects, and with others which will become apparent hereinafter, one feature of the present invention resides, briefly stated, in a wind turbine having a shaft and a plurality of blades mounted on the shaft for joint rotation therewith, wherein each blade has an outer portion which has an outer edge formed at the outer end of a radius with a center at an axis of the shaft and extends rearwardly from the outer edge over a circumference described from the center, and an inner edge which is rearwardly offset relative to the outer edge in a direction which is normal to this radius.

It has been shown that when the wind turbine is designed in accordance with the applicant's invention, the blades with the shaft rotate even in condition of a very weak wind which is hardly recognizable by an observer, generates in condition of such weak wind a sufficient torque, and does not produce any noise.

In accordance with another feature of the present invention, the outer portion of each blade has a length which corresponds to the distance by which the inner edge of the blade is offset relative to the outer edge of the blade in the normal direction.

Still another feature of the present invention is that the inner edge of each blade is offset in the normal direction from the outer edge by a distance which is greater than the diameter of the shaft, so that a gap is formed between the shaft and the inner edge of each of the blades. The wind which flows against each of the blades can thereby pass through the gap so as to flow toward the front surface of the adjacent blade.

A further advantageous feature of the present invention is that each blade has an outer concave section and an inner convex section. When the blade is designed in accordance with this feature, the wind which flows against the concave section is forced to flow against the convex section of the blade toward the center of the blades into the above mentioned gap.

Still a further feature of the present invention is that the blades are uniformly distributed in the circumferential direction and include upper blades and lower blades arranged so that the blades of each group are offset relative to each other, and the blades of the upper group are offset relative to the blades of the lower group.

Finally, the blades of the above mentioned groups are connected with one another and with the shaft by means of three disks located, respectively, above the upper blades, between the upper and lower blades, and below the lower blades.

The novel features which are considered characteristic for the present invention are set forth in particular in the appended claims. The invention itself, however, both as to its construction and its method of operation, together with additional objects and advantages thereof, will be best understood from the following description of preferred embodiments when read in connection with the accompanying drawing.

DESCRIPTION OF A PREFERRED EMBODIMENT

Figure 1:
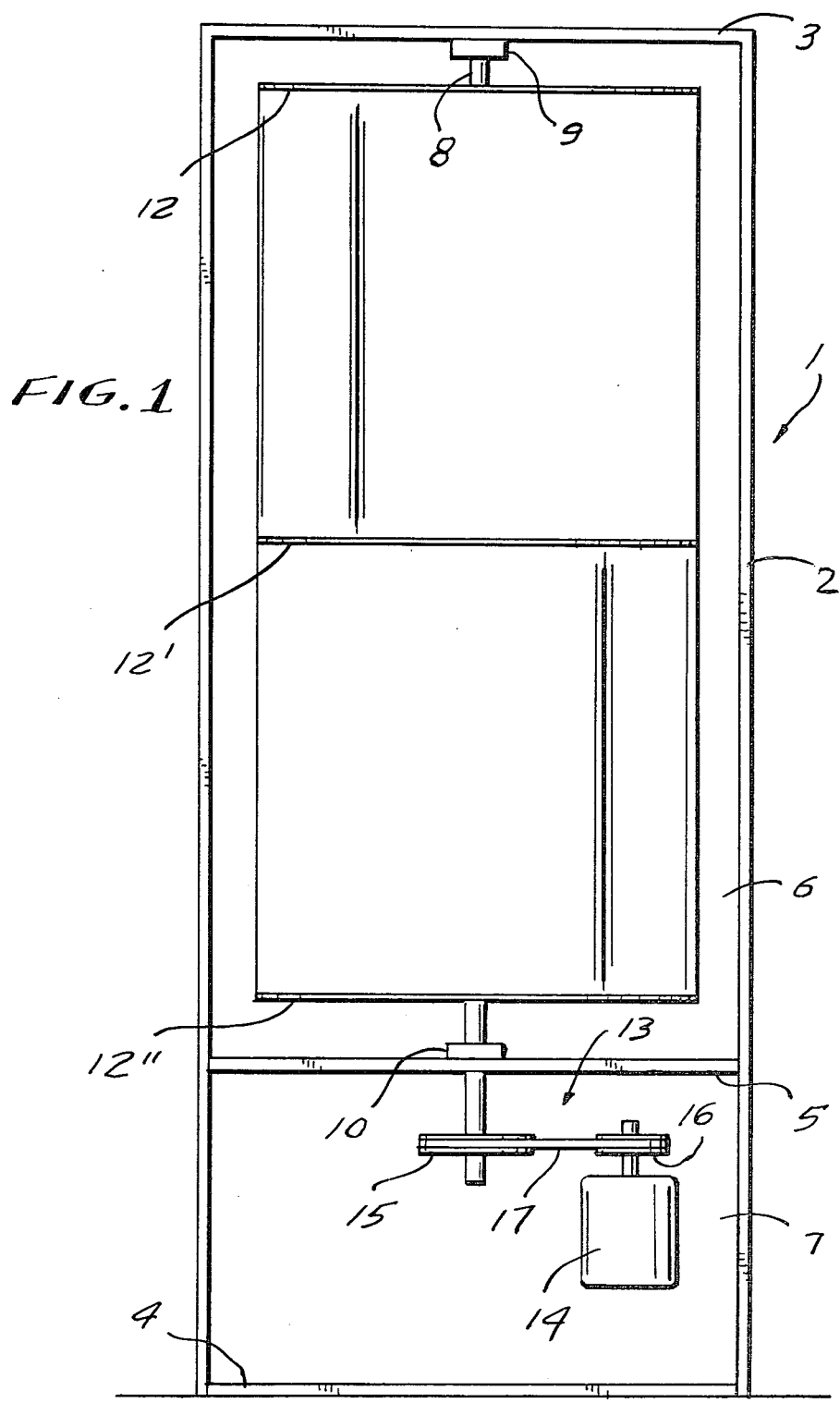
FIG. 1 is an elevational view showing a wind turbine in accordance with the present invention.
Figure 2:
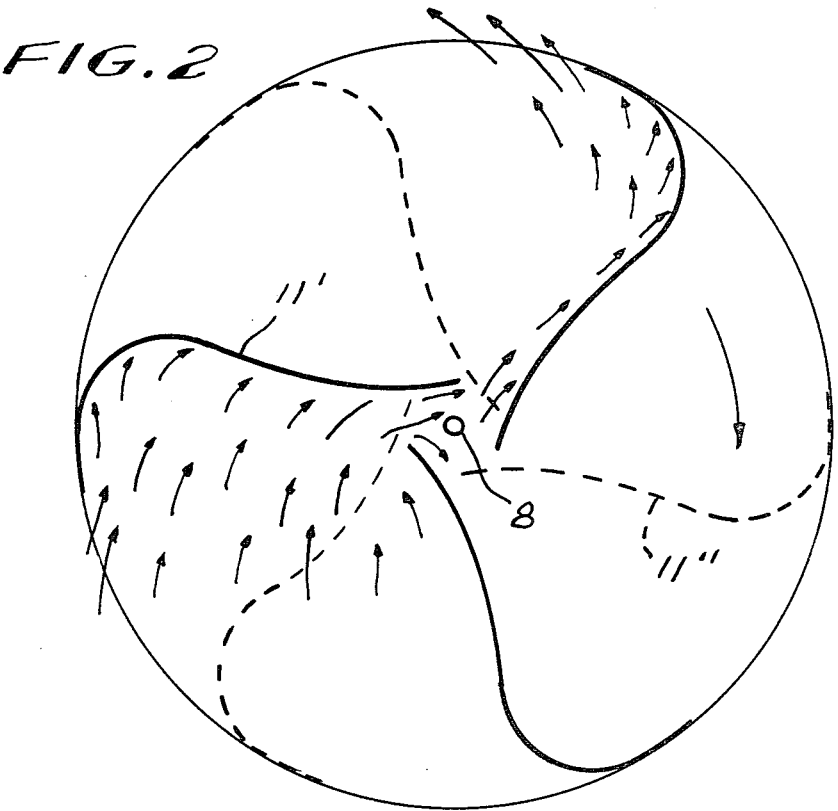
FIG. 2 is a plan view of one group of blades of the wind turbine in accordance with the present invention.

A wind turbine in accordance with the present invention has a frame which is identified in toto by reference numeral 1 and includes vertical elements 2 connected with one another by upper horizontal elements 3 and lower horizontal elements 4. The frame 1 may have a parallelpiped shape. An intermediate element 5 formed, for example, as a plate subdivides the interior space of the frame 1 into an upper compartment 6 and a lower compartment 7. The upper compartment 6 is open at all its sides to provide an unobjectionable flow of wind into the compartment.

A shaft 8 extends in a vertical direction and is rotatably mounted in the frame 1 by means of bearings 9 and 10. More particularly, the upper bearing 9 is arranged in not shown connecting members of two upper horizontal elements 3, whereas the lower bearing 10 is arranged in the plate 5. A plurality of blades are fixedly connected with the shaft 8. The blades include a group of upper blades 11' and a group of lower blades 11". Three disks 12, 12' and 12" are fixedly connected with the shaft 8. The upper disk 12 is located above the upper blades 11' and fixedly connected with these blades; the intermediate disk 12' is located between the upper blades 11' and the lower blades 11" and fixedly connected with the blades of both groups; and the lower disk 12" is located below the lower blades 11" and fixedly connected with these blades. Thereby, the blades 11' and 11" are fixedly connected with the shaft 8 for joint rotation therewith.

The elements 2, 3 4 and 5 of the frame 1 may be composed of steel, the disks 12, 12' and 12" may be composed of glass, and the blades 11' and 11" may be composed of aluminum. It is to be understood that other materials may be utilized for manufacture of the above mentioned elements and the materials of the latter are not germane to the present invention. The blades 11' and 11" may be connected with the disks 12, 12' and 12" for example by screws. The bearings 9 and 10 may be self-adjusting bearings.

The wind turbine in accordance with the invention is provided with transmission means which includes a belt transmission identified in toto by reference numeral 13 and a generator identified by reference numeral 14. The belt transmission includes a belt pulley 14 mounted on the shaft 8, a belt pulley 16 mounted on a shaft of the generator 14, and a belt 17 arranged on the belt pulley 15 and the belt pulley 16. The ratio between the beltpulley 15 of the shaft and the belt pulley 16 of the generator may be equal to, for example, 8:1.

Figure 3:
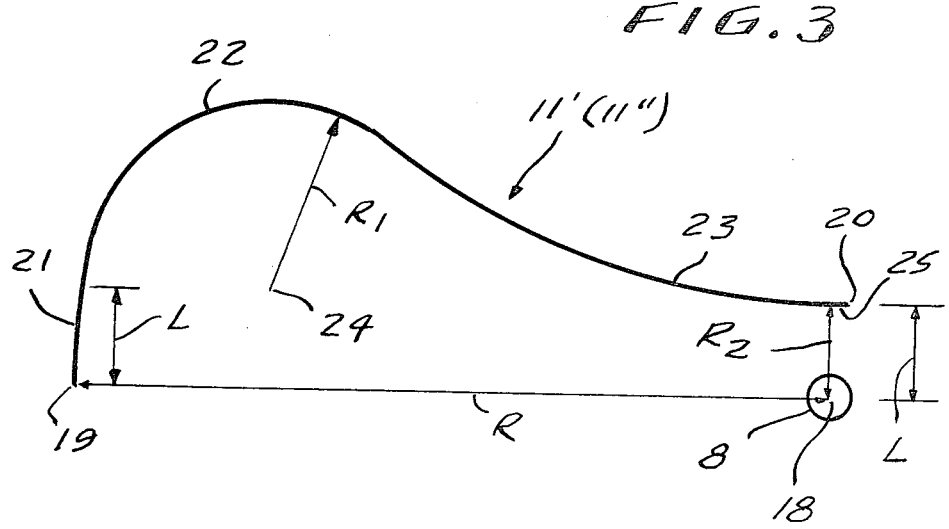
FIG. 3 is a plan view of one of the blades of the inventive wind turbine.

FIG. 3 shows the shape of each of the blades 11′ and 11″ in accordance with the present invention. The shaft 8 rotates about an axis which is identified by reference numeral 18. Each blade has a radially outer edge which is identified by reference numeral 19 and a radially inner edge which is identified by reference numeral 20. The outer edge 19 is located at a radius R described from a center coinciding with the axis of rotation 18. Each blade has an outer portion 21 extending rearwardly from the outer edge 19 over a circumference described from the center 18. The inner edge 20 of each blade is offset relative to the outer edge of the same blade in a direction which is normal to the radius R. Moreover, the inner edge 20 is offset from the center 18 by a distance which is greater than the diameter of the shaft 8 so that a gap is formed between the shaft 8 and the inner edge 20 of each blade. The outer portion 21 has a length L equal to the distance by which the inner edge 20 is offset relative to the outer edge 19 and the center 18 of each blade.

Each blade has a central portion which includes an outer section 22 and an inner section 23. The outer section 22 is concave and advantageously circular. It is described by a radius R1 from a center 24 which is offset from the outer edge 19 in the normal direction by a distance equal to the length L. The radius R1 is advantageously equal to 2L. The center 24 is spaced from the outer edge 19 in a direction from the outer edge 19 toward the inner edge 20 by a distance which is advantageously equal to 2L. Thus, the outer section 22 of the blade forms a recess for the wind, whereas the inner section 23 descends toward the shaft so as to reduce this recess. When the wind flows against the outer section 22 it is forced to flow toward the shaft and then through the gap between the shaft and the inner edge 20 toward the adjacent blade.

Each blade has a further section which is identified by reference numeral 25 and extends between the section 23 and the inner edge 20 in direction from the outer edge 19 toward the inner edge 20. More particularly, the section 25 extends beyond a radius R2 which is normal to the radius R and advantageously has a length equal to one quarter of the length L. The radius R may be equal to 8L. Advantageously, the disks 12, 12′ and 12″ have a radius which is also equal to 8L so that the outer portion 21 of each blade coincides with the circumference of the disks. The shaft 8 may have a diameter equal to one half of the length L. The length L may be selected to be three inches, and the radii R, R1 and R2 and the lengths of the portion 21 and the section 20 can be calculated respectively.

The upper blades 11′ are offset relative to the lower blades 11″ in a circumferential direction. Each upper blade 11′ is offset relative to the respective lower blade by an angle of 60°. On the other hand, the blades of each group are offset.

It will be understood that each of the elements described above, or two or more together, may also find a useful application in other types of constructions differing from the types described above.

While the invention has been described and illustrated as embodied in a wind turbine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A wind turbine, comprising a shaft rotatable about an axis; and a plurality of blades mounted on said shaft and arranged to be rotated by wind and to thereby rotate said shaft, each of said blades having an outer portion which has an outer edge formed at the outer end of a radius with a center at said axis and extends only rearwardly from said outer edge over a circumference described from said center, each of said blades having an inner edge which is rearwardly offset relative to said outer edge and also from said radius in a direction which is normal to said radius by a predetermined distance, said outer portion having a length which corresponds to said distance, each of said blades having a central portion including a radially outer section and a radially inner section formed so that said radially outer section is concave toward said radius and described from a center which is offset from said radius in the normal direction by said distance, whereas said radially inner section is convex toward said radius.

2. A wind turbine as defined in claim 1, wherein said shaft has a predetermined diameter, said inner edge of each of said blades being offset in the normal direction by a distance which is greater than the diameter of said shaft so that a gap is formed between said shaft and said inner edge of each of said blades.

3. A wind turbine as defined in claim 1, wherein said inner edge of each of said blades is offset radially beyond a further radius which is normal to said first-mentioned radius, as considered in a direction radially from said outer edge toward said inner edge of a respective one of said blades.

4. A wind turbine as defined in claim 1, wherein said inner edge of each of said blades is offset radially beyond a further radius which is normal to said first-mentioned radius, as considered in a direction radially from said outer edge toward said inner edge of a respective one of said blades, said central portion of each of said blades including a further section which extends between said inner section and said inner edge and has a length which does not exceed one fourth of said length of said outer portion.

5. A wind turbine as defined in claim 13, wherein said axis is an upright axis, said plurality of blades including a first group of upper blades located above and a second group of lower blades located below, the blades of one of said groups being offset relative to the blades of the other of said groups in a circumferential direction.

6. A wind turbine as defined in claim 5, wherein said blades are uniformly distributed in the circumferential direction so that the blades of each group are offset relative to each other by 120°, and each of the blades of one of said groups is offset relative to a neighboring blade of the other of said groups by 60°.

7. A wind turbine as defined in claim 1, wherein said axis is an upright axis, and said plurality of blades includes a first group of upper blades located above and a second group of lower blades located below; and further comprising means for connecting said blades with said shaft and including three disks extending normal to said shaft and fixedly connected with the latter, said three disks including an upper disk located above the blades of said first group of blades and fixedly connected with the same, an intermediate disk located between the blades of said first and second groups of blades and fixedly connected with the same, and a lower disk located below the blades of said second group of blades and fixedly connected with the latter.

8. A wind turbine as defined in claim 7, wherein each of said disks has a radius corresponding to said first-mentioned radius.

9. A wind turbine as defined in claim 7; and further comprising a frame and means for rotatably mounting said shaft in said frame and including bearing elements.

* * * * *